United States Patent [19]
Cobbs et al.

[11] Patent Number: 5,206,840
[45] Date of Patent: Apr. 27, 1993

[54] GEOPHONE IMPLANTATION SYSTEM

[76] Inventors: David C. Cobbs, 669 E. 139 Pl., Glenpool, Okla. 74033; James H. Cobbs, 5350 E. 46th St., Tulsa, Okla. 74135

[21] Appl. No.: 703,507

[22] Filed: Jun. 17, 1991

[51] Int. Cl.⁵ .................................. G01V 1/00
[52] U.S. Cl. .................................. 367/178; 181/102; 181/122; 181/401
[58] Field of Search .................. 181/101–106, 181/122, 401; 367/178, 188, 912; 166/156, 192, 285, 287, 290; 175/237, 413

[56] References Cited

U.S. PATENT DOCUMENTS

| | | | |
|---|---|---|---|
| 2,149,427 | 3/1939 | Faust | 181/102 |
| 2,354,548 | 7/1944 | Ricker | 177/352 |
| 2,740,489 | 4/1952 | White et al. | 181/5 |
| 3,690,164 | 9/1972 | Gabillard et al. | 73/151 |
| 4,134,097 | 1/1979 | Cowles | 340/7 |
| 4,446,541 | 5/1984 | Cowles | 367/75 |
| 4,534,020 | 8/1985 | O'Brien | 367/188 |
| 4,607,698 | 8/1986 | Wood | 166/285 |
| 4,879,695 | 11/1989 | Meadows | 367/25 |
| 4,886,129 | 12/1989 | Bourdon | 175/40 |

Primary Examiner—Brian S. Steinberger
Attorney, Agent, or Firm—Head & Johnson

[57] ABSTRACT

The method of implanting a geophone in the earth including the steps of drilling a borehole in the earth, pumping grout into the borehole, pumping a geophone down the interior of a cylindrical pipe positioned in the borehole, the end of the pipe being adjacent the desired point of implantation of the geophone, and pumping additional grout into the borehole to completely surround the geophone and allow the grout to solidify. In one embodiment, a tubular drill pipe having a severable drill bit at the lower end is first used to drill a borehole, after which the drill bit is hydraulically severed from the tubular drill pipe and the grout and the geophone are pumped down into the hole through the interior of the drill pipe.

9 Claims, 4 Drawing Sheets

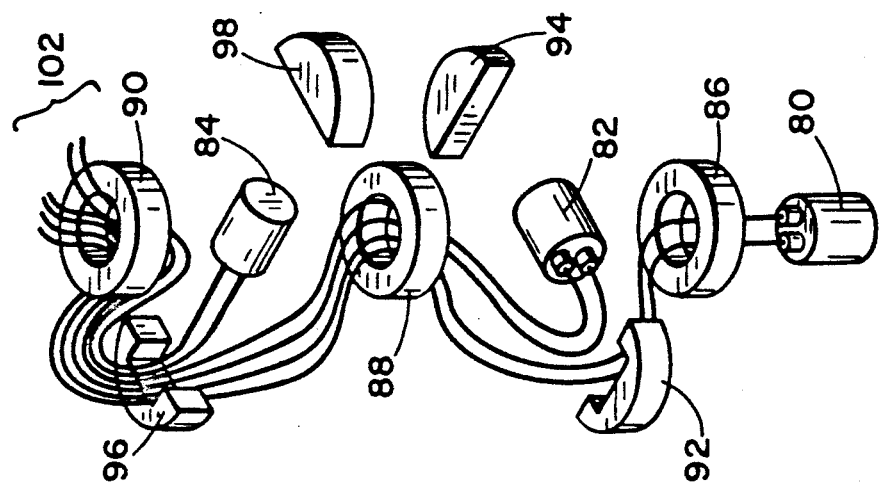
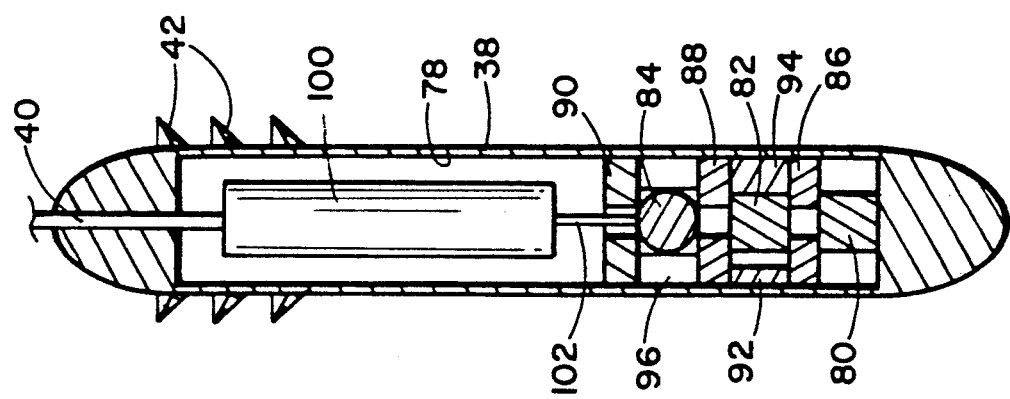
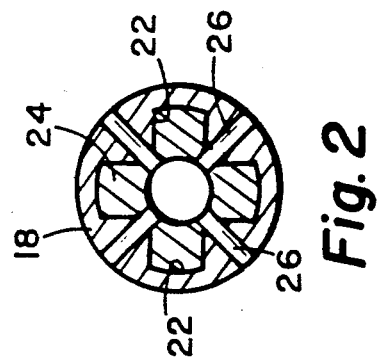
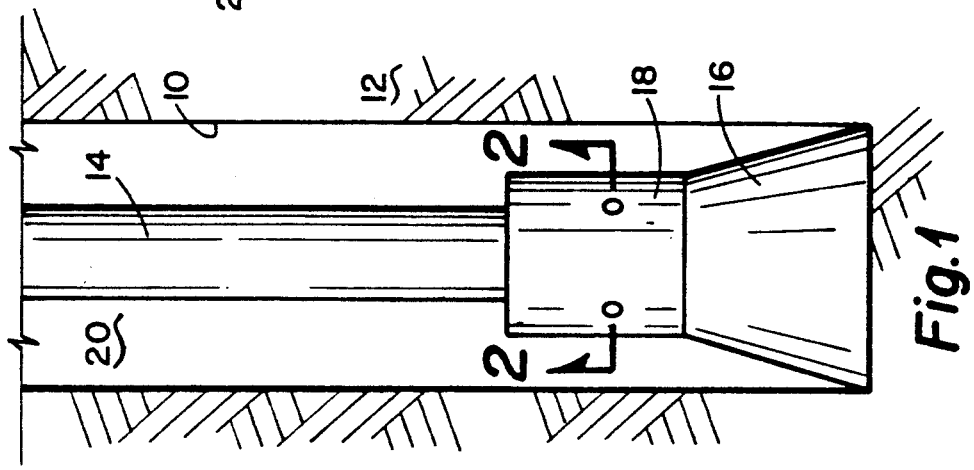

GEOPHONE IMPLANTATION SYSTEM

BACKGROUND OF THE INVENTION

Current methods of monitoring seismic waves must contend with a multitude of coherent noise sources. On land, standard practice is to couple geophones to the ground with a spike attached to their bases. The geophones receive noise signals from wind and any traffic which may be in the area. In marine seismic surveys, hydrophones are suspended in the water and register incoming signals. Included in these signals are noise trains from such sources as wind, wave motion, currents, marine life and vessels which may be in the vicinity of the hydrophone.

Presently there are very few methods for improving signal-to-noise ratios for seismic monitors. On land, the signal-to-noise ratio is sometimes enhanced by shallow burying of the geophones. This improves the acoustic coupling slightly while it reduces the noise level by partially isolating the geophones from noise sources. The success of this method is rather limited because of acoustic dispersion in the near surface. Additionally, shallow burial of geophones gives only slight isolation from environmental noise effects. Similar results are obtained in water with the use of ocean bottom seismographs or "bay phones". The geophone is coupled to the sea floor which is a better acoustic conductor than the water. Besides the improved signal because of improved coupling, the ocean bottom seismograph is further removed from wind, wave and vessel noise sources.

The techniques presented herein will give an order-of-magnitude improvement in the signal-to-noise ratio for seismic sensors. The concept is to implant the geophones in competent subterranean rock. By drilling a borehole into competent rock and then grouting the geophones into place, the signal will be greatly improved because of solid coupling to an acoustically conductive medium. Additionally, the sensors will be well insulated from environmental noise sources. This isolation is accomplished in part because the dispersive surface above the geophones will insulate them from surface noise sources.

With the better signal-to-noise ratio, this technique has applications beyond the seismic exploration for oil and gas. The increased sensitivity of the system will allow for acoustic tomographic monitoring of oil or gas depletion in hydrocarbon reservoirs. Similarly, the techniques can be used in monitoring seismic events or micro-seismic activity associated with enhanced oil recovery operations, hydrocarbon depletion caused subsidence or overburden subsidence due to underground mining operations. The implanted geophones can also be used in rock quality and progress monitoring of underground construction.

Implanted geophones also can be used as remote seismic detectors. Such seismic monitoring can provide early warning of earthquakes or monitor nuclear explosions for test yield restrictions. With the use of amplitude measurements and triangulation within an array of geophones, the magnitude of a seismic event and its location can be determined. The techniques can also be used for permanent monitoring adjacent to open pit mining or any other situation which employs blasting operations. Such monitoring can be for environmental compliance or for forensic reasons.

These applications mentioned for drill- and grout-geophone implanting are not by any means all inclusive. Rather, they are mentioned to give a perspective of the wide range of applicability for grouting geophones into boreholes.

SUMMARY OF THE INVENTION

The method of this invention employs a drilling system which is basically the same as that used in drilling for oil and gas. Typically a rotary drive provides torque through the drill pipe to a drill bit. The bit can be either a drag type or a more traditional roller cone bit depending on the hardness of the rock to be drilled. The bit can be attached through a coupling with shear pins so it can be pumped off, if necessary, to use the drill pipe to hold the hole open while running the geophones into place. The drill pipe also serves as the conduit for drilling fluid, usually water, which will flow across the bit face and remove the rock cuttings from the borehole.

To drill geophones into place in a marine environment requires essentially the same equipment. The drilling rig is placed on any offshore drilling facility. The operation is the same regardless of whether the rig is on a semi-submersible platform, a jack-up platform, drill ship or a drilling barge. Water depth and economics are the determining factors for the method of putting the rig on location.

If the borehole walls are stable enough, the drilling assembly can be removed from the hole and the drill bit removed. The drill pipe (without the drill bit) then is run back into the hole for use as a guide for the instrument package. One or more geophones are then pumped down the drill pipe and cement is also pumped down the drill pipe to grout the sensors into place. The drill pipe can then be removed from the hole, leaving the geophones and cable attached thereto in place.

When hole stability is a problem, it may be necessary to remove the drill bit without removing the drill pipe from the borehole. To do this, the bit is raised a few feet off the hole bottom and a plug pumped down the drill pipe so that drilling fluid pressure will shear the pins which hold the drill bit on the pipe. The geophones are then run into the hole as before.

The procedure for running the geophones into place includes the following steps: (1) Drill to total depth. (2) Pick up off bottom 3-5 ft. (3) Hook up surface running assembly with geophones and plugs installed on the drill pipe. (4) Pump down first plug with grout to shear bit. (5) Pump down geophones with grout. (6) Raise drill pipe to place instruments in open hole while pumping a volume of grout calculated to give appropriate cover of grout above already deposited geophones. (7) Raise drill pipe an appropriate distance above deposited geophones. (8) If drill pipe has been raised above grout, flush drill pipe with water to clear grout from inside and outside of drill pipe. (9) Allow the grout to take its initial set. (10) If desired, pull drill pipe out of the borehole, stripping it from the instrument cable.

Some applications can benefit from geophone packages at different levels in the borehole. The geophone packages for such an application will be connected in series and the signals from the packages multiplexed onto a single recording system. This method is analogous to the multi-channel method used in seismic exploration.

The procedure for running multiple geophone packages into a hole will be site specific. If the penetrated formations are weak and the hole deep, it may be necessary to grout the instruments into the hole in stages to prevent fracturing the formations or losing grout into a formation. Some control will be possible by formulating a low density grout but staging may still be necessary. To assure good separation and isolation of zones penetrated by the hole, good cementing practice as developed by the petroleum industry should be followed as well as the practice specific to the site of geophone placement. The geophone packages will be made up with the appropriate lengths of cable separating individual geophones.

The initial operation of pumping the bit loose from the drill pipe and pumping the geophone or geophones down the hole will be essentially the same as previously described. Above the surface, connection is made with a lubricator through which following instrument packages can be introduced into the system while pumping. Standard petroleum industry wire line blowout preventers can be used for the sealing elements.

When the first geophone or geophones reach the bottom of the drill pipe, all of the geophones and cable to be installed in the hole will now be in the drill pipe. When stage placement of grout is planned, the geophones will be pumped down the drill pipe with a volume of grout sufficient to fill the hole to the planned level. The grout will be displaced from the drill pipe with water (preferred) or mud. Shortly before all of the grout is displaced from the drill pipe, pumping will stop and the drill pipe raised to a point slightly below the top of the grout in the annulus. Pumping will then resume while raising the drill pipe until all of the grout has been displaced from the drill pipe. The drill pipe will then be flushed with water or mud. Slow pumping will continue to keep the hole clear until the first grout stage has had time to establish its initial set.

The placement of the second and subsequent stages of grout will be identical. A predetermined volume of grout will be pumped down the drill pipe and displaced with water or mud. As the displacing fluid approaches the bottom of the drill pipe, the pipe will be raised to prevent mixing of the displaced and displacing fluids below the planned interfaces. This procedure will be followed until the hole has been completely grouted.

In grouting multiple geophones in a drill hole, the option exists to vary the grouting to achieve specific purposes. Variations can include the placement of mud or a low density grout to minimize the possible interference of signals traveling through the borehole with signals received from the surrounding earth.

A variation possible for a single geophone is to grout it in the open hole, as previously described, and then grout the balance of the conduit pipe (either drill pipe or other) in the hole by circulating grout to the surface. Where grout must be placed in stages, the pipe must be withdrawn from the hole and stripped from the cable, at least to the point where the balance of the grout to be placed can be circulated to the surface.

The final alternative is to leave all instrument packages in the placement pipe. If this option is selected then the quality of the grout both inside and outside the pipe is critical for acceptable acoustic coupling. If steel pipe is used there will be signal travel up or down the pipe from the point where the signal first encounters the borehole. If acoustic coupling is good otherwise this can be compensated for. If it is possible to use plastic pipe there will be some attenuation of the signal in the low velocity plastic, but this will not be a significant factor. Longitudinal signal travel, because of velocity differences, will not be a distorting factor.

If it is elected to leave the placement pipe in the hole, it can be cut off at ground level after grouting. In the case of a marine application, a left hand threaded coupling can be placed in the pipe at sea bottom to permit unscrewing the pipe at sea bottom.

The geophone package employed will depend on the application. When it is preferred to receive compression wave signals only, the instrument package will consist simply of a hydrophone, or possibly an array of hydrophones suspended in the borehole. However, if detailed structural information is required, the geophone package is more complicated. For detailed structural analysis, it is necessary to record both compressional and shear waves. The structural geophone package will contain a compressional geophone and two perpendicular shear wave geophones.

Application and location are the determining factors for the data collection system. When access permits, the most simple and least expensive method for data collection is a set of cables connecting the grouted geophones to a central data gathering point.

In a submarine or inaccessible environment, the data can be transmitted by a radio frequency seismic telemetry system.

The recording and processing equipment will also depend on the application intended for the grouted-in-place geophones. If the system is to be used for seismic exploration or exploration for minerals, the geophysical industry standard recording and processing equipment will be sufficient. The same equipment will also be adequate for subsurface structural evaluation and blast monitoring and mining applications. In these cases, it is possible to use the signal source that originates the seismic event to initialize the time zero of the data recording.

For application which require long term monitoring, a standard seismic recording system is not appropriate. The continuous recording can very quickly overflow the recording media. A solution to this problem is to have microcomputer control of the recording system. The computer would be programmed to record data for a specific time interval only if a signal is received which has an amplitude above a selected threshold value. In this manner, the data for applications such as nuclear yield monitoring, subsidence monitoring for oil reservoirs or underground mining and micro-seismic events for earthquake predictions can be processed automatically in virtual real time.

A better understanding of the invention will be had with reference to the following description and claims, taken in conjunction with the attached drawings.

DESCRIPTION OF THE DRAWINGS

FIG. 1 is an elevational diagrammatic view of a drill pipe having a detachable drill bit at the lower end thereof, the drill bit and drill pipe having been used to produce a borehole in the earth's surface.

FIG. 2 is a cross-sectional view taken along the line 2—2 of FIG. 1 showing one means of providing connection of a drill bit to the lower end of a string of drill pipe whereby the drill bit is rotatably locked to the drill pipe but whereby the drill bit can be severed from the drill pipe by the application of hydraulic pressure.

FIG. 3A shows the drill bit and drill string interconnected and with a plug which had been pumped down the interior of the drill string resting on the drill bit.

FIG. 3B shows the drill bit having been severed from the tubular drill string by the application of hydraulic pressure to sever connecting pins and wherein the drill string has been raised in the borehole slightly above the severed drill bit.

FIG. 3C shows a geophone package being pumped down the interior of the drill string, the geophone package having a cable extending to the earth's surface.

FIG. 3D shows the geophone package cemented in the borehole with the cable extending to the earth's surface after the cementing step has taken place and the tubular drill string removed.

FIG. 5B shows the actuation of the blowout preventers for passing the second geophone downwardly into the interior of the drill string.

FIG. 7A shows diagrammatically a geophone package of the type which may be employed in the invention for implantation in a borehole in the earth and showing the components which can be included in the geophone package for detecting compression waves, shear waves, or both.

FIG. 7B is an exploded view of a portion of the components of the geophone package of FIG. 7A used for movement detection or pressure wave detection in the earth and showing the assemblage of the geophone for detecting shear waves along two perpendicular axes and for detecting compression waves.

DESCRIPTION OF THE PREFERRED EMBODIMENT

Figure 3A:
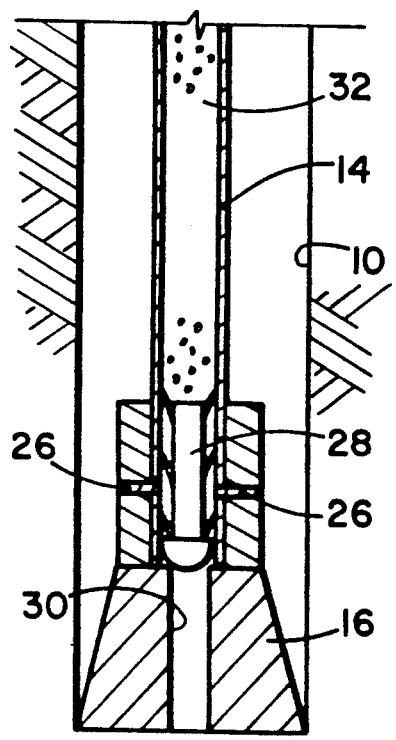
FIGS. 3A, 3B, 3C and 3D show diagrammatically sequence of severing the drill bit from the tubular drill string.

Referring first to FIGS. 1 and 2, a drilling system which may be used for practicing the invention is illustrated. FIG. 1 shows the lower end of a borehole 10 which has been drilled from the earth's surface. The borehole 10 has been drilled in the typical way that oil or gas wells are drilled, that is, utilizing a tubular drill string 14 which extends from the earth's surface. At the surface (not shown) the drill string is connected to mechanisms for rotating it and for permitting downward travel of the drill string as the borehole 10 is advanced.

Affixed to the lower end of the tubular string 14 is a drill bit 16 having an integral upper connecting portion 18. The drill bit 16 is of any standard type for forming a borehole in the earth upon the rotation thereof and may be of the drag or rotary cone type. The bit typically includes at least one internal drilling fluid passageway. The drilling fluid typically circulates back up in the annular area 20 between the exterior of the drill string 14 and the borehole 10 to the earth's surface. If drilling mud is used, it is typically recirculated.

The implantation of the one or more geophone packages in the earth after the formation of borehole 1 can be accomplished by removing the drill string 14 having bit 16 attached thereto and subsequently inserting into the borehole 10 a tubular drill string having an open lower end in a manner which will be described subsequently. However, one method of practicing the invention involves implanting one or more geophone packages without removing the drill string 14 from within the borehole 10. For this purpose, it is necessary to sever the drill bit 16 from the lower end of drill string 14.

As shown in FIG. 2, the drill bit coupling portion 18 has formed therein internal grooves 22 which matingly received splines 24 formed on the lower end of the tubular drill string 14. The telescoping relationship between the grooves 22 and splines 24 rotatably lock the drill bit 16 to the lower end of the drill string 14. To retain the drill bit on the lower end of the drill string, pins 26 are received in openings in the bit connection portion 18 aligned with openings in the portion of the tubular drill string lower end having splines 24. Thus, as shown in FIG. 2, the drill bit 16 and tubular drill string are locked to each other.

Figure 3B:
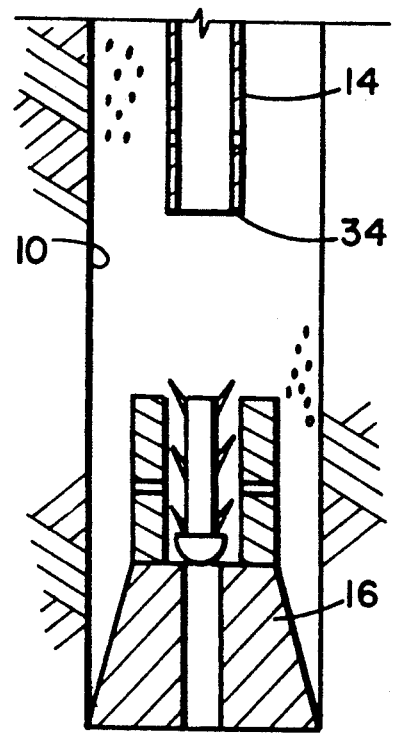

FIGS. 3A and 3B show a method of hydraulically separating the bit from the drill string. When drilling has been continued to the point where the bottom of the borehole 10 has reached the desired depth and in preparation for implanting one or more geophone packages in the borehole, the steps of severing the bit 16 from the tubular drill string 14 include pumping a plug 28 down the interior of the drill string. The method of injecting plug 28 into the interior of the drill string will be described subsequently.

Bit 16 has at least one passageway 30 for fluid flow therethrough. The diameter of passageway 30 is less than the internal diameter of the tubular drill string 14. When plug 28 is pumped downwardly within the drill string, it flows freely until it encounters drill bit 30. Plug 28 closes the fluid passageway 30 through the drill bit, thereby stopping the flow of fluid downwardly within the drill string. As hydraulic pressure builds in fluid 32, pins 26 are sheared, thereby allowing the separation of the tubular drill string 14 and the bit 16, as shown in FIG. 3B. The lower end 34 of the drill string 14 is now open.

This procedure saves a great deal of time which would normally be employed in removing the drill string with the drill bit 16 attached and thereafter running the drill string back in the hole after the bit has been removed. Drill bits have a limited life and their life expectancy can be fairly accurately projected so that a drill bit will be utilized having a life expectancy of that which is necessary to drill the borehole 10 to the desired depth. Thereafter the bit has little or no salvage value. So, by the method of this invention, the bit 16 is simply left in the borehole, thereby saving the time required to completely remove the drill string. Further, in any borehole there is always the possibility of a cave-in when the drill string is removed and re-inserted. By the method wherein the drill string does not have to be removed after the borehole is completed, the serious economic consequences of a borehole cave-in when the drill pipe has been removed is avoided.

Figure 3C:
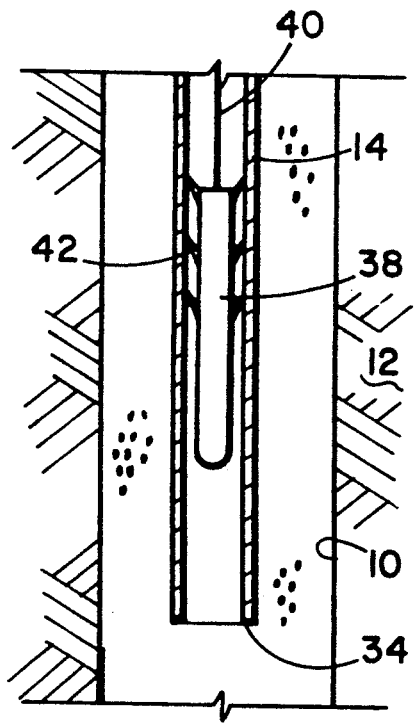

With the bit 16 severed from the drill string, the drill string can now be used for injecting grout and one or more geophone packages into the earth and for securely cementing the geophone package or packages in the earth. FIG. 3C shows a geophone package 38 having a cable 40 extending therefrom to the earth's surface. The geophone package 38 is shown with external fins 42 which are preferably flexible and which insure movement of the geophone package 38 as fluid is pumped down the drill string.

After the borehole has been completed and the drill bit severed, as has been described, the typical application includes first pumping into the borehole 10 a cement slurry or grout which is fluid when pumped, but which, upon passage of time, hardens into a consistency comparable to that of the earth's surface 12 surrounding the borehole. A quantity of the grout is first pumped to ensure that all areas surrounding the geophone package 38 after it is positioned in the borehole will be surrounded.

Figure 3D:
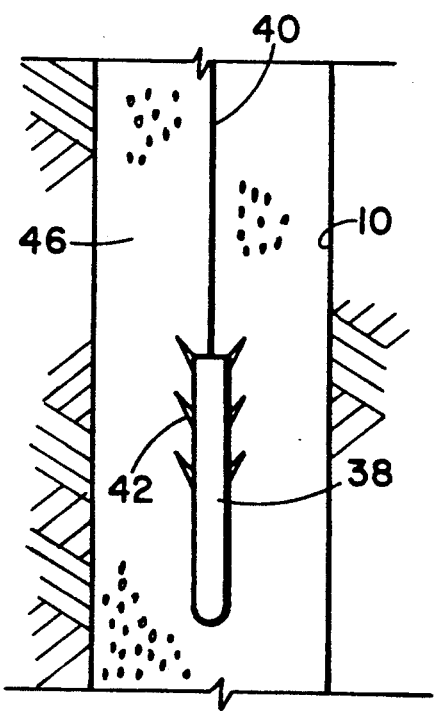

FIG. 3D shows the geophone package 38 positioned in the borehole 10 and completely surrounded by the cement grout 46. The tubular drill string has to be raised in the borehole after the implantation of the geophone package 38. If only a single geophone package 38 is to be implanted, the drill string may be completely removed from the borehole, stripping it off of the cable 40 or the drill string can be left in the borehole.

Figures 4A, 4B:
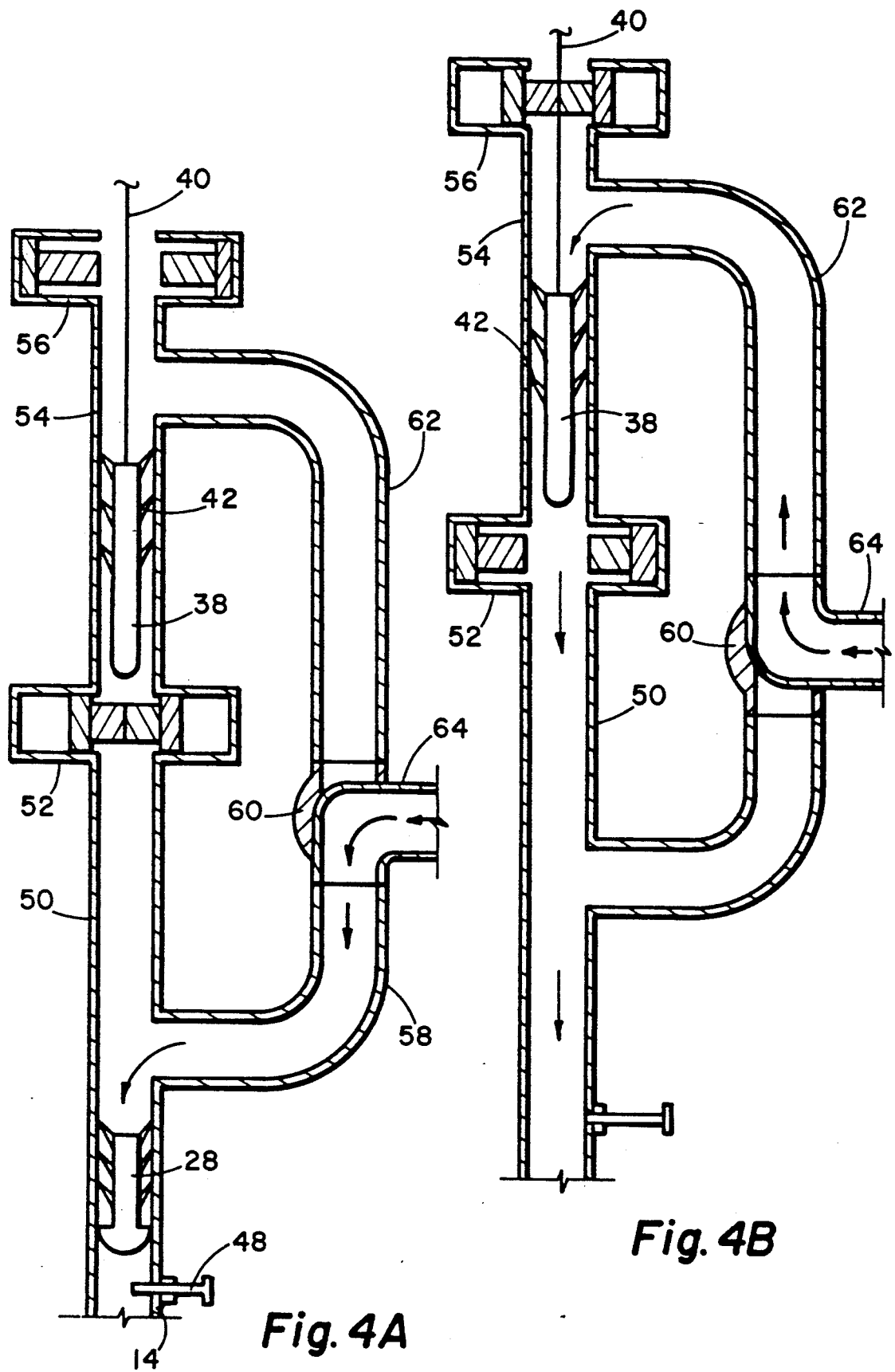
FIG. 4A shows diagrammatically a use of a typical oil well type blowout preventer arrangement for injecting a separating plug into the interior of the drill string with a geophone positioned ready to be subsequently introduced into the interior of the drill string.
FIG. 4B shows diagrammatically the use of the blowout preventer for moving the geophone downwardly into the drill string for positioning in the borehole.

FIG. 4A shows diagrammatically a setup utilizing conventional blowout preventers as a means of injecting a geophone package into the tubular drill string. The mechanism of FIG. 4A is located at the earth's surface. The drill string 14 has at the top an object interceptor 48 which is used to stop an object from moving therepast, but which lets fluid flow therepast. Plug 28 is shown in the tubular drill string and adjacent the object interceptor 48. In direct connection above the drill string 14 is a pipe 50 having a first blowout preventer 52 and above it a second pipe 54 having a second blowout preventer 56. A branch pipe 58 connects to the first pipe 50 and to a flow direction control valve 60. In like manner, a second branch pipe 62 connects the second pipe 54 with valve 60. In the embodiment of FIG. 4A, fluid flows from a hydraulic pump (not shown) through a source pipe 64 to valve 60. With the valve oriented as in FIG. 4A, the fluid flows through the first branch 58 into the pipe 50. With blowout preventer 52 closed, as illustrated, fluid pressure is applied downwardly into the interior of tubular drill string 14. When the object interceptor 48 is moved to the opened position, plug 28 will therefore pass into the upper end of tubular drill 14 and downwardly for use in severing the drill bit, as has been previously described. FIG. 4A shows the geophone package 38 in position within pipe 54 above the first blowout preventer 52 ready to be launched.

After the plug 28 has been forced downwardly and the bit separated from the drill string, as previously described, and after a quantity of cement slurry or grout has been pumped from the source pipe 54, through valve 60, through first branch pipe 58 and into the interior of the tubular drill string 14 and out the lower end 34 thereof into the borehole 10, the geophone package 38 can be launched. This is accomplished by closing the second blowout preventer 56 which closes around conductor 40 in a manner to prevent the escape of fluid, but which permits conductor 40 to be pulled through the blowout preventer. At the same time, the first blowout preventer 52 is opened. Valve 60 is oriented as in FIG. 4B so that fluid from source pipe 64 flows in the direction indicated by the arrows, that is, through the second branch pipe 62 into pipe 54. This fluid flow impinges against the fins 42 of geophone package 38 and causes it to move downwardly into the position as shown in FIG. 3C.

Figure 5B:
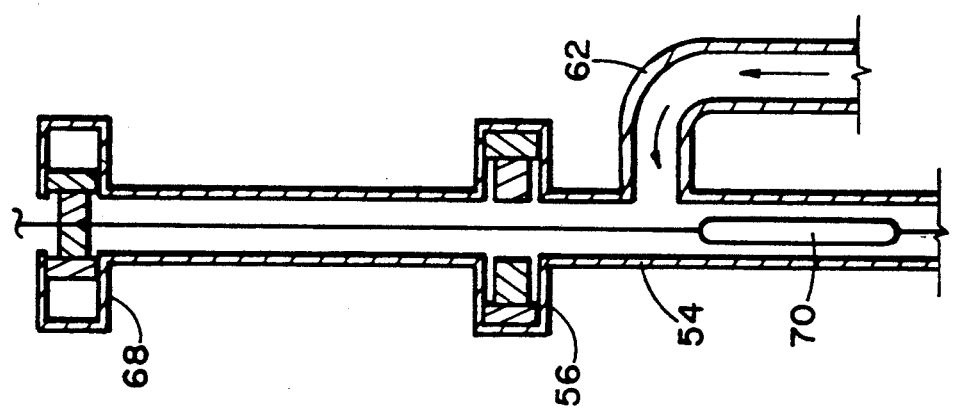
FIGS. 5A and 5B show diagrammatically the means of introducing into the interior of a tubular drill string a sequence of geophone packages connected to each other by cable, showing how one geophone package may follow another. In the arrangement of FIG. 5A, a second geophone package is positioned between two blowout preventers, the second geophone package being connected to a first geophone package which has already been introduced into the drilling system.
Figure 5A:
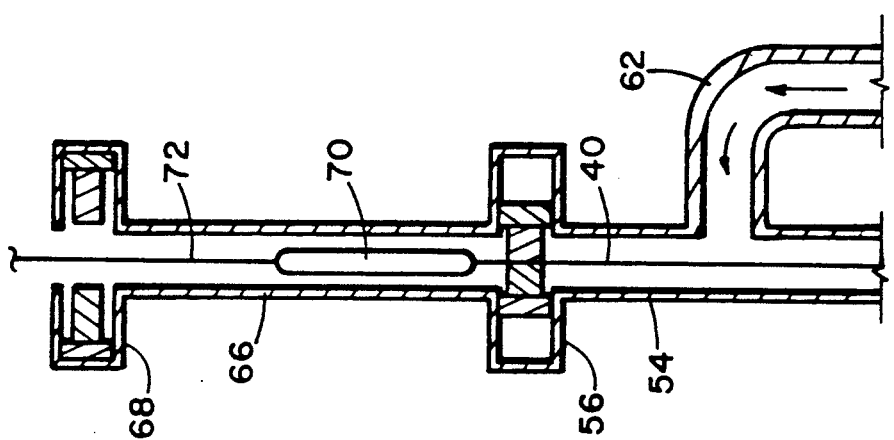

FIGS. 5A and 5B show additional apparatus employed when two or more geophone packages connected together by a cable are to be implanted. Positioned above second blowout preventer 56 is a third pipe 66 and a third blowout preventer 68. FIG. 5A shows the second blowout preventer 56 closed and with a second geophone package 70 within the third pipe 66 ready to be launched. The second geophone package 70 is connected to cable 40 and a second cable 72 extends from the second geophone package 70 for connection to instrument at the earth's surface (not shown).

FIG. 5B shows the second geophone package 70 launched. This is accomplished by closing the third blowout preventer 68, opening the second blowout preventer 56 and continuing to pump fluid through the second branch pipe 62 which flows downwardly through the second pipe 54 through the first blowout preventer 52 (not shown in FIGS. 5A and 5B) and thence into the drill string.

By repeating the sequence of the steps as illustrated in FIGS. 5A and 5B, three or more successive geophone packages may be implanted. Note that the second geophone package 70 is not shown with fins as are employed on the first geophone package and such will not normally be required since the second geophone package will be pulled into position by the cable 40 extending from the first geophone package.

Figure 6B:
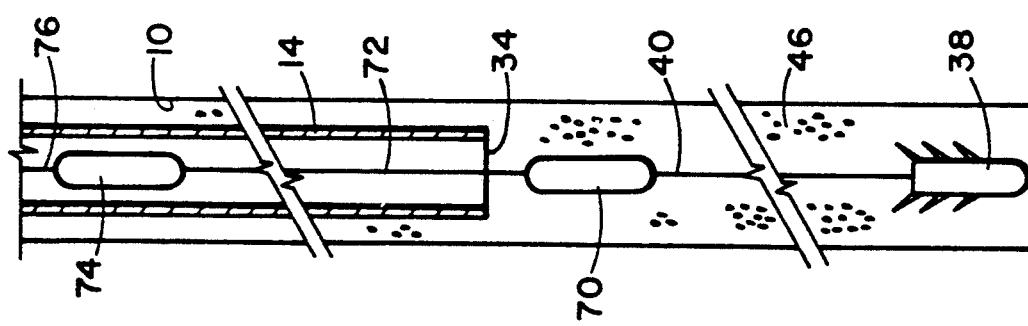
FIG. 6B shows a step following that illustrated in FIG. 5A in which the lead geophone package and the next adjacent geophone package have exited the lower end of the drill string and in which the drill string has been raised in the borehole.
Figure 6A:
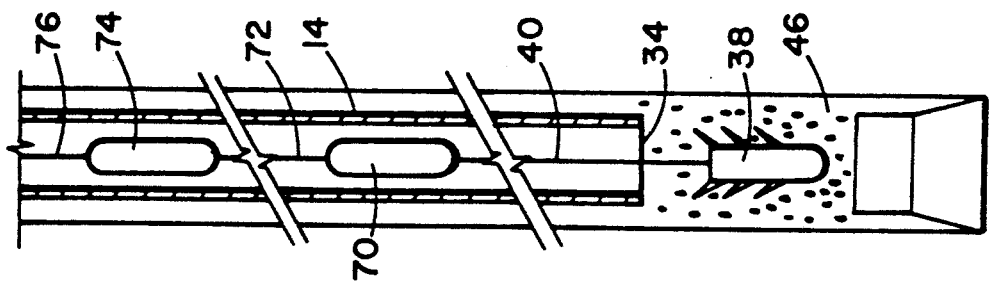
FIG. 6A shows diagrammatically positioning a plurality of geophone packages into a borehole in the earth and showing the lead geophone package having exited the lower end of the tubular drill string.

FIGS. 6A and 6B show the sequence at the bottom of the borehole. FIG. 6A shows the first geophone package 38 having passed out the bottom end 34 of the tubular drill string 14 and the second geophone package 70 still within the tubular drill string and a third geophone 74. Cement grout 46 is shown surrounding the first geophone package 38. Cable 40 connects the first to the second geophone package and cable 72 connects the second geophone package 70 to the third geophone package 74 and another cable 76 then extends from the third geophone to instrumentation at the earth's surface.

FIG. 6B shows the tubular drill string 14 having been raised slightly as additional grout is pumped downwardly to surround the second geophone package 70 which is pulled from the interior of the tubular string by the cable 40. The first geophone package 38 having been implanted and surrounded by grout 46 serving to anchor itself and provides pulling force to pull the subsequent geophone packages from within the interior of the tubular drill string, as the drill string is raised, which is preferably accomplished simultaneously with forcing additional cement grout down the interior of the drill string. The sequence of steps represented by FIGS. 6A and 6B are repeated until the third geophone package 74 is implanted. As each geophone package is implanted, additional grout is pumped down and when the last geophone package is implanted, additional cement grout is pumped above it so that all of the geophone packages are securely cemented in the borehole.

After all of the geophone packages have been cemented, the pipe may be flushed with water to remove any remaining cement grout therein and the pipe removed, stripping it from the cable extending to the earth's surface. Or, the pipe may be left in the borehole above the implanted geophone packages, if desired.

A diagrammatical illustration of a geophone package 38 for implantation is illustrated in FIGS. 7A and 7B. The geophone package body 38 has a central cavity 78 therein holding the geophone elements. A typical essential element of a geophone package is a compression wave sensor or compression wave geophone 80. The compression wave geophone 80 typically includes a weighted element suspended by springs which responds to vary slight movement. The weighted element typically includes a magnet surrounded by a coil of wire so that any movement changes lines of flux in the surrounding coil, producing an electrical signal. Compression wave geophones 80 are commonly employed such as in geophysical exploration and may be mounted directly on the surface of the earth to respond to movement of the earth. In some instances, the geophones mounted on the surface of the earth are provided with spikes for extending into the earth to more directly couple the geophone to the earth, and, as previously stated, in some instances the geophones 80 are buried in a shallow hole beneath the earth's surface. The present implantation system provides a highly improved means of mating the geophone to the earth which surrounds it.

In addition to the compression wave geophone 80, one or more shear wave geophones may also be employed in the geophone package. In the illustrated arrangement, a first shear wave geophone 82 and a second shear wave geophone 84 are employed. The first and second shear wave geophones are oriented so that their major axes of motion sensitivity are perpendicular to each other. Shear wave geophones 82 and 84 respond to shear waves which travel generally parallel to the earth's surface.

The geophones 80, 82 and 84 are separated by spacers 86, 88 and 90. In addition, shims 92 and 94 are mounted around the first shear wave geophone 82, and shims 96 and 98 retain the second shear wave geophone in proper position.

The conductor 40 extending from geophone package 38 may include wires attached to extend directly from each of the geophones 80, 82 and 84 which wires may extend to the earth's surface, that is, with a separate pair of leads for each geophone. Alternatively, cavity 78 of the geophone package may be of such size as to support a microprocessor and/or amplifier 100. Such circuitry may be powered by self-contained batteries if the intended life of use of the implanted geophone package is no longer than that which would permit the use of batteries. However, if the geophone package 38 is to have a very long life and the use of a microprocessor and/or amplifier 100 is employed, conductor 40 may be provided with wires applying voltage from the earth's surface. Individual conductors 102 from geophones 80, 82 and 84 are fed to the microprocessor and/or amplifier 100 when such is employed within the geophone package.

The exemplified embodiment of geophone package 38, as shown in FIGS. 7A and 7B, is emblematic of the type of geophone which may be implanted employing the system of this invention and it is understood that such is shown for purposes of exemplification and not limitation, and that other types of geophone components and/or systems may be employed.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A method of implanting a geophone package in the earth comprising the steps of:
   (a) drilling a borehole in the earth with a tubular drill pipe, at least the lower portion of the borehole remaining casingless:
   (b) pumping grout by means of a tubular pipe string into the borehole through the interior of the tubular pipe string, the tubular pipe string having an open lower end out through which the grout passes into the borehole;
   (c) pumping a geophone package down through the drill string and out the open lower end into the borehole;
   (d) pumping additional grout into the borehole to completely surround the geophone package; and
   (e) allowing the group to solidify the geophone package being thereby implanted in the borehole free of the tubular pipe and any borehole casing; and wherein step (a) includes the use of a tubular drill pipe having a severable bit attached thereto, including after step (a), severing the drill bit from the tubular drill pipe while the tubular drill pipe and bit are in the borehole and wherein, in steps (b), (c) and (d) the grout and geophone package are pumped down the interior of the tubular drill string to emerge into the borehole above the severed drill bit.

2. The method of claim 1 in which said geophone package has a conductor extending to the earth's surface.

3. The method of claim 1 including the step of pumping a plug down the interior of the tubular drill pipe to engage the drill bit and wherein the step of severing the drill bit includes applying hydraulic pressure against said plug.

4. The method of claim 1 including the step, after the drill bit is severed from the drill pipe, of lifting the drill pipe above the drill bit before the step of pumping the geophone package into the borehole.

5. The method of claim 2 including, in step (b), pumping a plurality of geophone packages into the borehole, the geophone packages being connected to each other by flexible cable means.

6. A method of implanting a geophone package within the earth comprising the steps of:
   (a) drilling a borehole into the earth, at least the lower portion of the borehole remains casingless;
   (b) positioning in the borehole a tubular pipe extending from the earth's surface, the pipe having an outside diameter less than the borehole providing an annular area therebetween;
   (c) pumping grout down the interior of the pipe, the pipe having an open lower end, the grout flowing out the pipe open lower end and into the annular area;
   (d) positioning a geophone package within the interior of the pipe at the earth's surface, the geophone package being of external diameter less than the internal diameter of the pipe;
   (e) pumping additional grout down the interior of the pipe thereby carrying the geophone package down the interior of the pipe and out the lower end thereof into the casingless borehole;
   (f) pumping additional grout down the interior of the pipe to completely surround the geophone package in the borehole; and
   (g) permitting the grout to solidity to thereby implant the geophone package free of the pipe and any borehole casing; and wherein the tubular pipe of step (b) is used in step (a) to drill the borehole; and wherein step (a) includes drilling a borehole using a tubular drill pipe having a severable bit on the lower end thereof.

7. The method according to claim 6 including after step (f), the step of removing the pipe from the borehole.

8. The method according to claim 6 after step (a) the step of severing the drill bit from the tubular pipe.

9. The method of claim 6 wherein the geophone package has a conductor extending therefrom to the earth's surface.

* * * * *